United States Patent [19]

Kimura et al.

[11] Patent Number: 5,583,630
[45] Date of Patent: Dec. 10, 1996

[54] OLDHAM COUPLING FOR A REVOLVING TYPE DEVELOPING DEVICE

[75] Inventors: Noriyuki Kimura, Kawasaki; Minoru Suzuki, Yokohama; Takatsugu Fuzishiro, Tokyo-to, all of Japan

[73] Assignee: Ricoh Company, Ltd., Tokyo, Japan

[21] Appl. No.: 611,498

[22] Filed: Mar. 6, 1996

Related U.S. Application Data

[63] Continuation of Ser. No. 248,678, May 25, 1994, abandoned.

[30] Foreign Application Priority Data

May 25, 1993 [JP] Japan ................................ 5-122944

[51] Int. Cl.⁶ .................................................. G03G 15/01
[52] U.S. Cl. ..................... 355/326 R; 355/245; 464/104
[58] Field of Search ............................... 355/326 R, 327, 355/245; 464/102, 103, 104, 105; 74/63

[56] References Cited

U.S. PATENT DOCUMENTS

| | | | |
|---|---|---|---|
| 2,756,573 | 7/1956 | Colby et al. | 464/104 |
| 3,116,619 | 1/1964 | Spielbaur | 464/105 |
| 4,835,565 | 5/1989 | Nagatsuna et al. | 355/259 |
| 5,168,319 | 12/1992 | Kimura et al. | 355/326 R |
| 5,223,893 | 6/1993 | Ikemoto et al. | 355/245 X |
| 5,243,388 | 9/1993 | Berns et al. | 355/245 |
| 5,331,378 | 7/1994 | Baker et al. | 355/245 X |

FOREIGN PATENT DOCUMENTS

| | | |
|---|---|---|
| 02-287577 | 11/1990 | Japan . |
| 04-15314 | 1/1992 | Japan .............................. 464/105 |

OTHER PUBLICATIONS

U.S. Ser. No. 08/053,674 filed Apr. 29, 1993.
U.S. Ser. No. 08/050,610 filed Apr. 22, 1993.
U.S. Ser. No. 08/018,258 filed Feb. 16, 1993.
U.S. Pat. No. 5,115,275 filed May 19, 1992 to Suzuki.
U.S. Ser. No. 08/248,678 filed May 25, 1994.

*Primary Examiner*—Nestor R. Ramirez
*Attorney, Agent, or Firm*—Oblon, Spivak, McClelland, Maier & Neustadt, P.C.

[57] ABSTRACT

A joint having an OLDHAM state coupling at a leading edge thereof is held movably in a direction which is parallel to a joint axis at a full-color printer body. A coupling gear is substantially connected to a developing roller disposed in each mono-color developing unit, which makes up a revolving type developing device. At the time of developing by one of the mono-color developing units, the joint is capable of moving in parallel to the axis of the joint in the state of being rotated toward the coupling. A projection is further provided at the leading edge of the coupling, and a claw is further provided at the end of the coupling gear. Thereby, smooth engagement between the coupling gear and the coupling is made by the help of the OLDHAM state coupling, the projection and the claw. As a result, the driving force is transmitted from the joint to the developing roller disposed in the developing unit, so that the developing roller can rotate at a predetermined speed and direction.

14 Claims, 8 Drawing Sheets

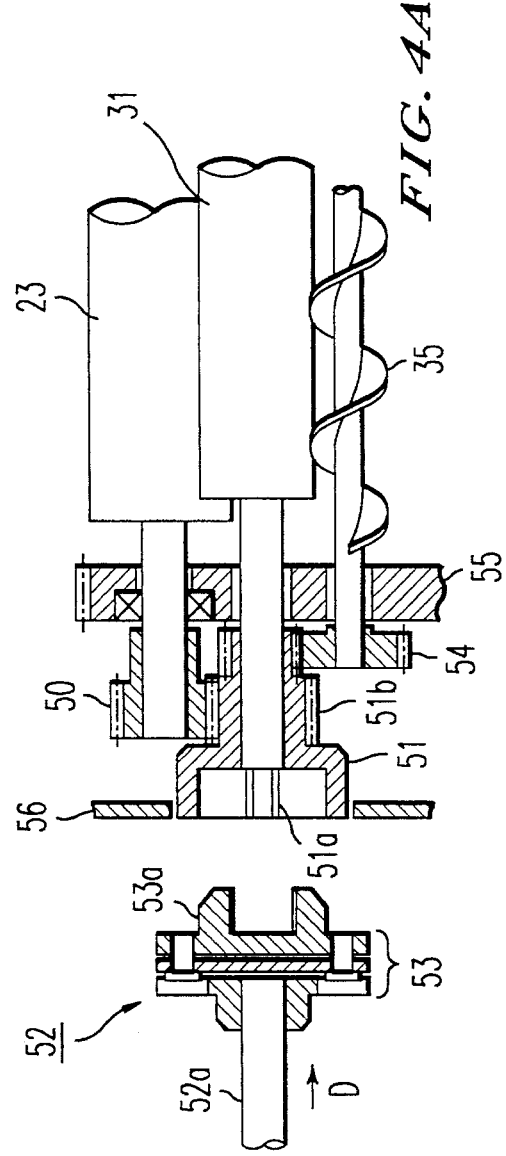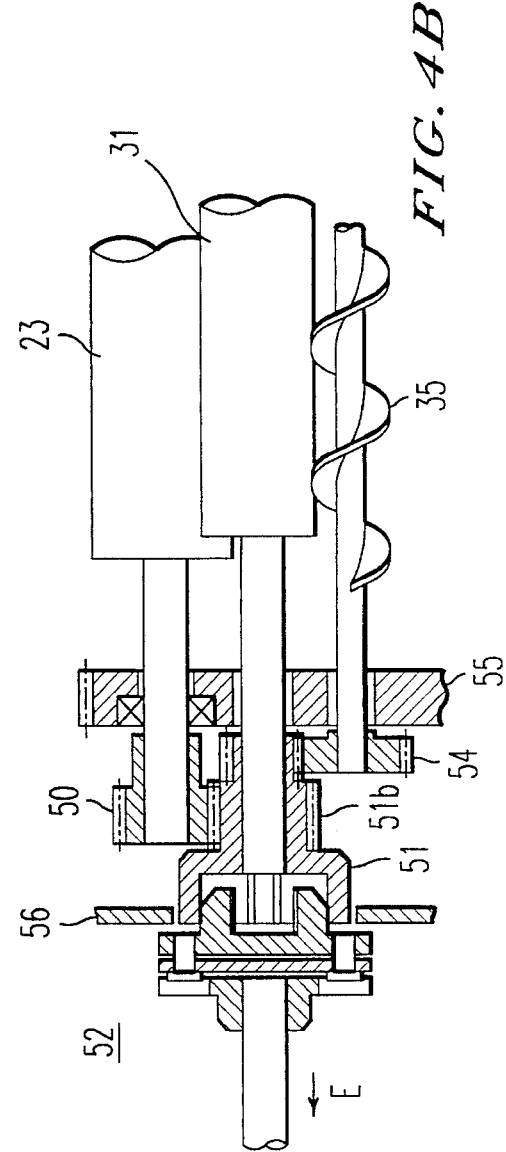

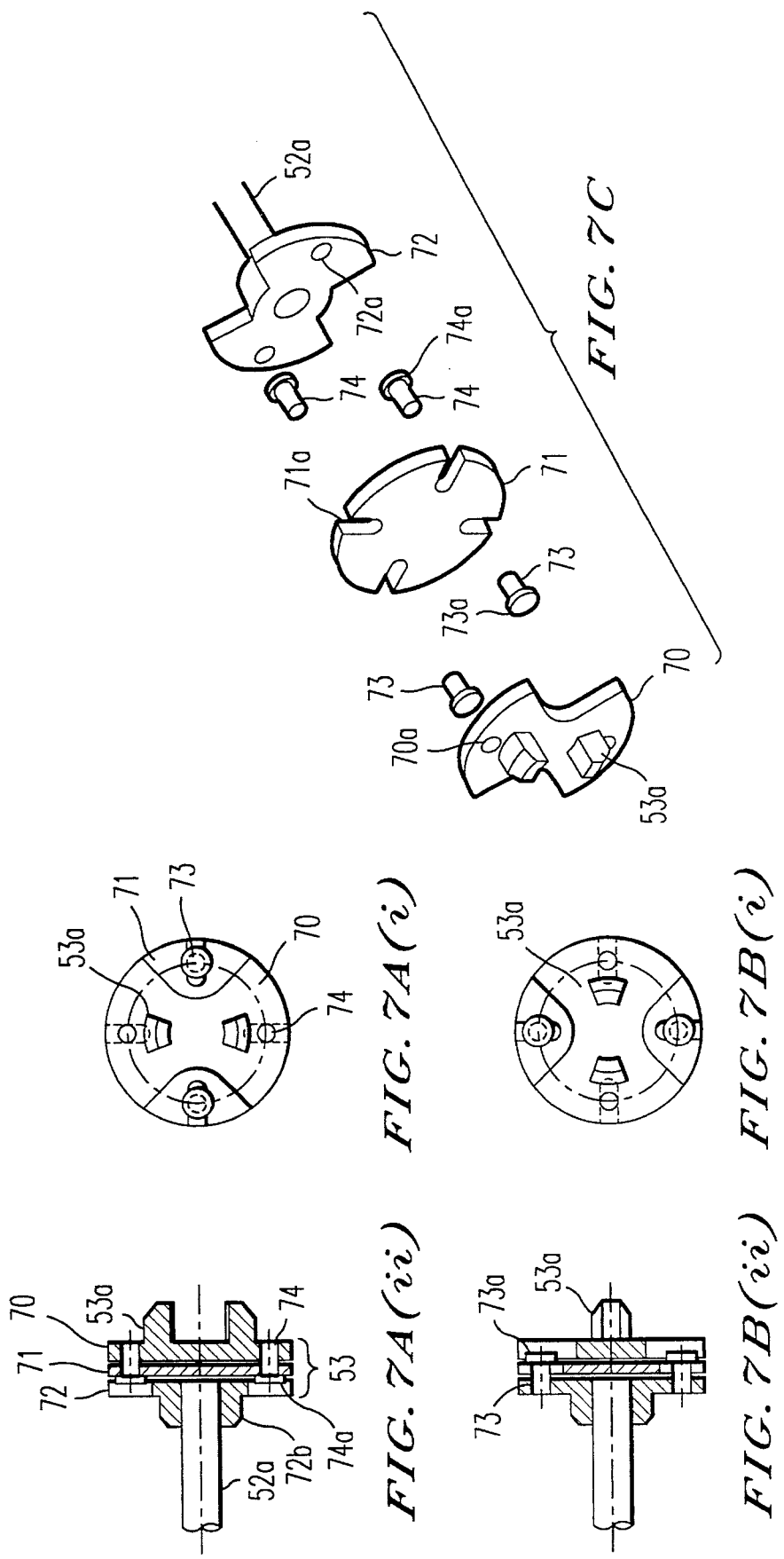

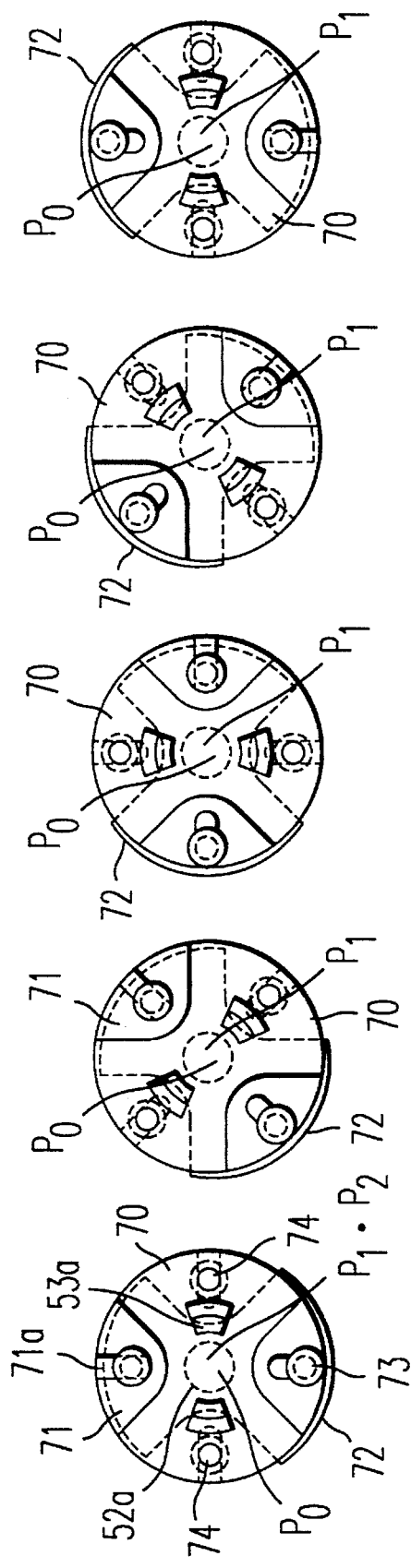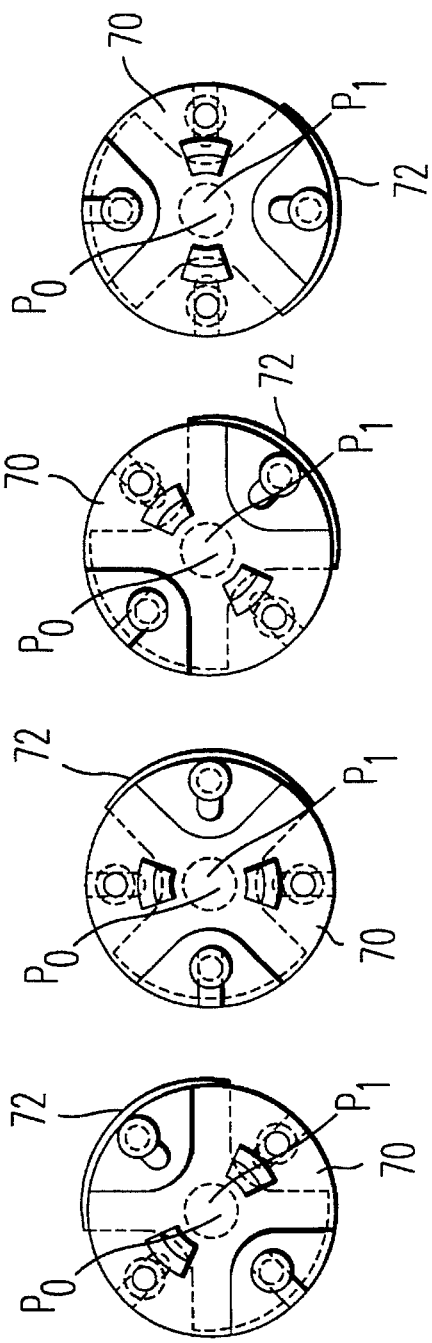

OLDHAM COUPLING FOR A REVOLVING TYPE DEVELOPING DEVICE

This application is a Continuation of application Ser. No. 08/248,678, filed on May 25, 1994, now abandoned.

BACKGROUND OF THE INVENTION

1. Field of the Invention

The present invention relates to an improvement of a developing device for a color image forming apparatus, for example, a copier, a facsimile machine, a printer, etc.

In particular, the present invention relates to a revolving type developing device having a plurality of developing units, which is composed of a developing roller and a mono-color toner (i.e., cyan, magenta, yellow and black).

2. Discussion of the Related Art

A conventional developing apparatus for a color image forming apparatus has a revolving type developing device, in which a plurality of developing units each having a different mono-color toner are installed and disposed adjacent to a photo-conductive drum to develop a latent image formed thereon.

In such a device, after one of the mono-color developing processes is completed, the developing device revolves about itself and faces another developing unit to the photo-conductive member for development with different mono-color toner. Thereby, an excessive scale of the developing device is avoided due to the form of the developing device, as shown in the specification of Japanese Published Utility Model Application Number 52-110442/77 and Japanese Published Patent Application Number 58-172660/83.

However, in the developing device disclosed in the former specification, a driving gear disposed in the copier body and a thrusting gear disposed in the developing unit interfere with each other when both gears are engaged with each other. Therefore, the mechanism has a drawback in that the driving force cannot be transmitted precisely from the driving source to the developing device.

Furthermore, if both gears can engage smoothly and precisely, the connection between them cannot be released freely at the position where the engagement is made due to the existence of a cam plate rigidly fixed to the body.

In addition, in the developing device disclosed in the latter specification, the developing gear and driving gear conflict with each other when the engagement between them is made. Furthermore, if it is kept going even in such a condition, namely the developing gear is rotated regardless of such an engagement condition, the teeth of the gears are broken and, as a result, the engagement of them is broken.

Also, if a transmitting device of the driving force (for example, the driving gear mentioned above) is fixed rigidly at the body of the image forming device and there exists an unevenness of the size in the transmitting tools (for example, the driving gear disposed in the copier body and the thrusting gear disposed in the developing unit), the rotational speed of the transmitting gear becomes uneven and the gear begins vibrating. This adversely effects the engaging condition. As a result, unevenness of the toner image, unevenness of the toner density and scattering of the toner in the copy sheet are introduced under the above condition of developing. Also, an unevenness of the rotation speed of the developing roller and the vibration of the developing device are caused by an unevenness of the rotation of the gear.

Additionally, in the revolving type developing device as described in the above-mentioned specification, it is difficult to make a positional accuracy when one of the developing units is positioned against the photoconductive member by the action of revolving and positioning thereof. Therefore, a cost of the parts for the positioning means and the driving force transmitting devices rises and the structure thereof becomes complex.

SUMMARY OF THE INVENTION

The present invention was made in consideration of the above matters. According to the present invention, a joint having an OLDHAM state coupling at a leading edge thereof is held movably in a direction in parallel to the joint axis at the full-color printer body. At the time of developing, the joint is moved in parallel to the axis of the joint in the state of being rotated toward the coupling gear connected to the developing roller disposed in the developing unit. A projection provided in the coupling is engaged with a recession provided in the coupling gear and a claw disposed in the recession.

Thereby, the driving force is transmitted from the joint to the developing roller, so that the developing roller can rotate at a predetermined speed and direction with a simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(a) and 4(b) are sectional views showing the state of the engaging driving device with the developing device of the present invention;

FIGS. 7(a), 7(b) and 7(c) are views of the coupling of the present invention;

FIGS. 8(a)–8(i) are front views of the coupling during rotation thereof showing the relation between the centers of the disks of the coupling at every 45° angle of the rotation;

FIGS. 10(a') and 10(b') are partially enlarged sectional views of the gear tooth showing the engagement and mechanical force occurred by the other embodiment of the present invention;

DESCRIPTION OF THE PREFERRED EMBODIMENTS

Figure 1:
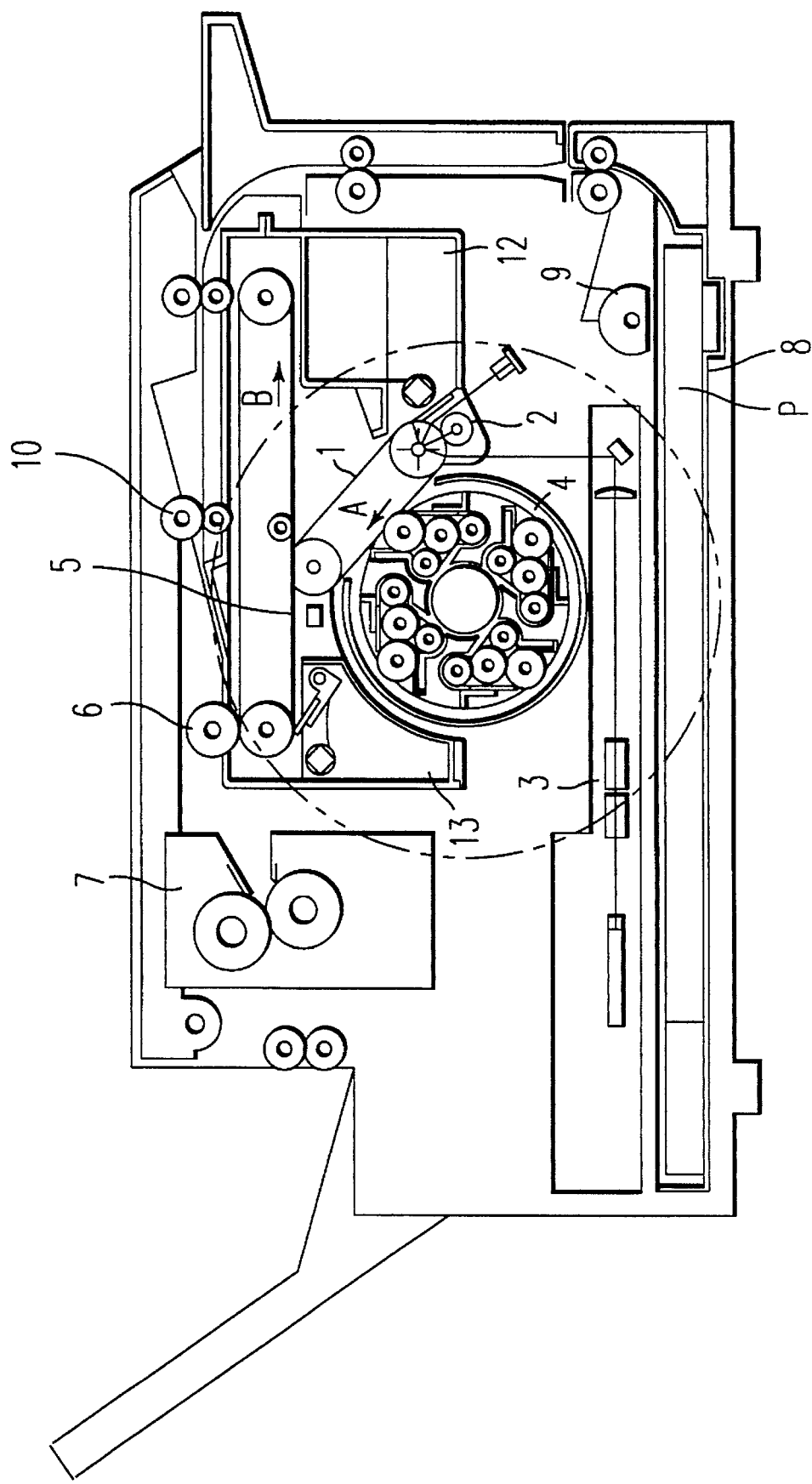
FIG. 1 is a sectional view of the color printer having the developing device of the present invention.

Referring now to the drawings, wherein like reference numerals designate identical or corresponding parts throughout the several views, in FIG. 1, the endless belt 1 as a latent image carrier is discharged by the discharging roller 2 equally, and radiated with the beam generated by the laser optical device 3 in response to the image signal generated by the image controlling device not shown in the figures, so that a latent image is formed on the endless belt 1.

One of the mono-color image signals, for example yellow, magenta or cyan, those of which are filtered from a full color image signal, is utilized as the signal, and a latent image for the different mono-color is formed by the laser beam controlled in response to the signal. The latent image for different mono-colors is formed respectively developed by the yellow toner, magenta toner, or cyan toner (or black toner), each of which is accommodated in the revolving type developing device 4. Thereby each of the color toner image is formed on the endless belt 1 respectively Elements 12 and 13 schematically illustrate toner boxes for the developing device 4.

After that, the endless belt 1 is rotated in a direction as shown by the arrow A in FIG. 1, so that each of the color toner images are transferred to the intermediate transfer belt 5 synchronously rotating in a direction as shown by arrow B in FIG. 1.

Thereby, the yellow toner image, the magenta toner image and the cyan toner image are transferred respectively to be superimposed on the intermediate transfer belt 5. The superimposed toner image, namely the full-color image, is further transferred to a copy sheet P fed from a feeding tray 8 by a feeding roller 9 through a registrating roller 10 by one chance of the transferring. After that, the full-color toner transferred copy sheet P is transported by rollers 6 to a fixing device 7 where the copy sheet P is fixed by the fixing device 7 to thereby obtain the full color image copy.

Figure 3:
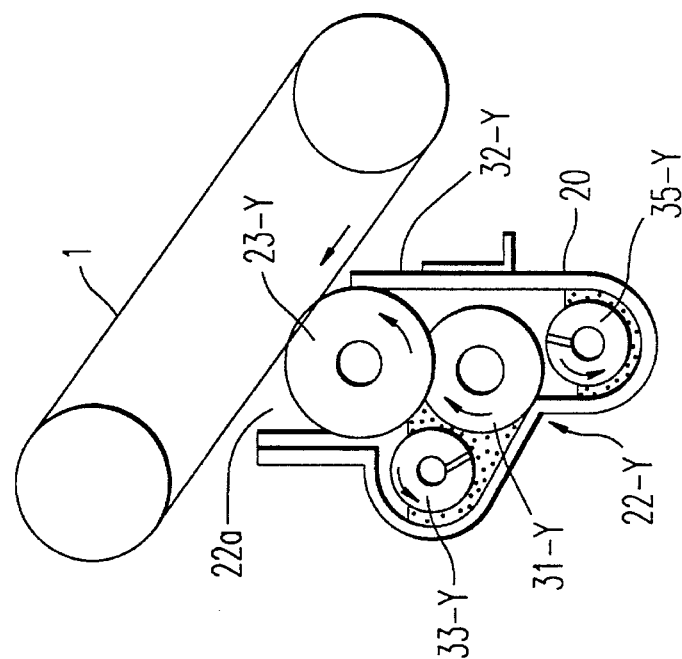
FIG. 3 is a sectional view of one of the developing units of the present invention.
Figure 2:
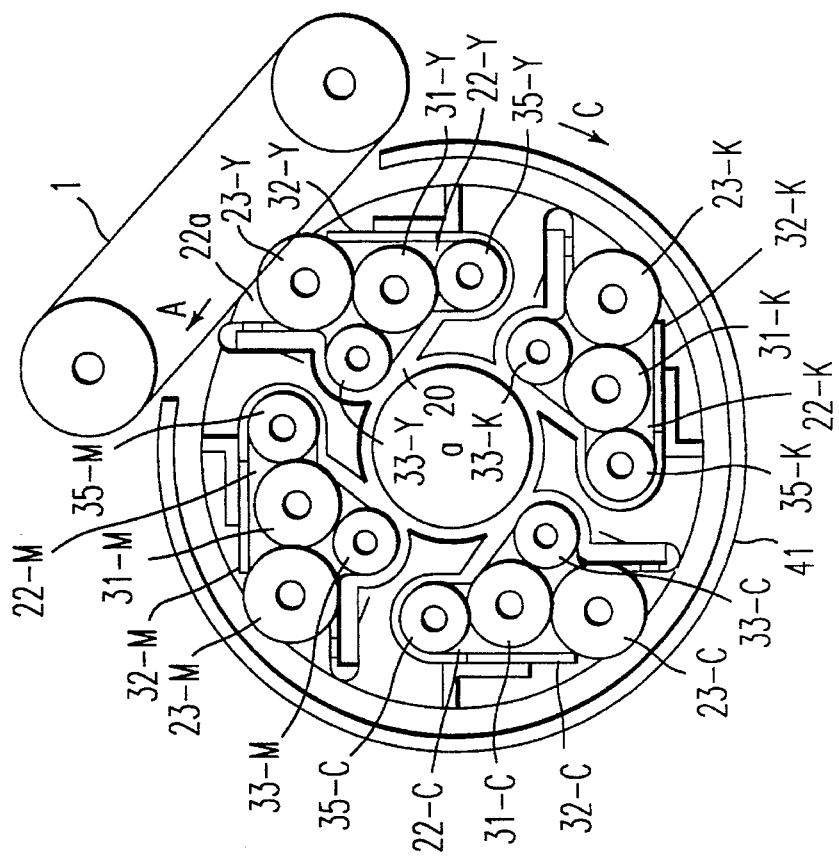
FIG. 2 is a sectional view of the developing device of the present invention.

FIG. 2 is a cross sectional view of the developing device 4 of the present invention showing the inner part thereof. As shown in FIGS. 2 and 3, the revolving type developing device 4 is disposed below the photoconductive belt 1. In the developing device 4, the casing 20 rotates around the center o and is driven in the direction as shown by the arrow C. The casing 20 is configured unitedly and dived into four rooms there inside defined by casing sections (-Y, M, C, K), so that each of the four mono-color developing units 22 (-Y, M, C, K) can be disposed therein. A cover 41 is associated with the casing 20. In each of the developing units 22 (-Y, M, C, K), a developing roller 23 (-Y, M, C, K) is disposed therein and appears from the opening 22a formed on the casing 20 to develop the latent image formed on the photoconductive belt 1 with the corresponding mono-color toner by applying the mono-color toner thereto. A toner supplying roller 31 (-Y, M, C, K) is respectively disposed adjacent to a devoloping roller 23 (-Y, M, C, K) and supplies toner to the devoloping roller 23 (-Y, M, C, K). Each of the developing units 22 (-Y, M, C, K) further includes toner first and second transferring devices 33 (-Y, M, C, K) and 35 (-Y, M, C, K).

In the above embodiment, non-magnetic one-component toner is utilized for each of the mono-color toner (-Y, M, C, K) and accommodated in the developing unit 22.

Hereinafter, the driving force transmitting mechanism of the developing device is explained referring to FIG. 4(a) and FIG. 4(b). FIG. 4(a) shows the state that the transmitting of the driving force is not made. To the contrary, FIG. 4(b) shows the state that the transmitting thereof is made.

A coupling gear 51 is fixed coaxially to a toner supplying roller 31, which supplies the toner to the developing roller 23, at one side edge thereof to rotate together with a coupling 53. In the coupling gear 51, a concaved portion is formed and a claw 51(a) is disposed therein. Reference numeral 55 illustrates a side plate of the developing unit, which supports, at least, the axis of the toner supplying roller 31.

At the leading edge of a joint device 52, the coupling 53 having a structure like an OLDHAM joint is connected unitedly to a joint axis 52a which is rotated by a driving force not shown in the figures. Also, a pair of projections 53a are formed at the leading edge thereof.

In the full-color printer body, the joint device 52 is disposed and is capable of rotating coaxially with both the coupling gear 51 and the toner supplying roller 31 when they are at the position for developing, and is capable of moving to the direction as shown by the arrow D in FIG. 4(a).

When a predetermined developing unit 22 having a certain color toner is brought and positioned at the predetermined developing position by the action of revolving the developing device 4 to develop the latent image formed on the photo-conductive belt 1, the joint device 52 is moved toward the direction shown by the arrow D by a pushing device, for example, a solenoid, not shown in the figures, in a manner of being rotated by the driving force. As shown in FIG. 4(a), when the joint device 52 is moved toward the direction shown by the arrow D by a predetermined length, the projection 53a reaches both the concaved portion and the claw 51a of the coupling gear 51, thereby the engagement between them is made (FIG. 4(b)).

Therefore, the toner supplying roller 31 is rotated in the predetermined direction and at a predetermined speed by the driving force transmitted through the engagement thereof. A gear 51b is formed on the outer surface of the sleeve of the coupling gear 51 and meshes with a gear 50 which is connected to the developing roller 23 and with a gear 54, which is connected with both the first and second toner transferring devices (33,35).

Thereby, the driving force is transmitted, first, to the toner supplying roller 31, second, to the developing roller 23 and after that both the first and second toner transferring devices (33,35). Therefore, at the time of developing the latent image, a mono-color toner is collected and transferred to the toner supplying roller 31 by both the first and second toner transferring devices (33,35) and the toner is further supplied to the developing roller 23 by the toner supplying roller 31.

The projection 53a of the coupling device 53 is formed in the shape of a taper, so that it is inserted to the concaved portion of the coupling gear 51 smoothly at the time the joint 52 moves toward the coupling gear 51. The joint 52 moving toward the coupling gear 51 can be rotated by the driving force so that the coupling device 53 can be engaged surely with the claw 51a and the concaved portion disposed in the coupling gear 51.

Figure 5:
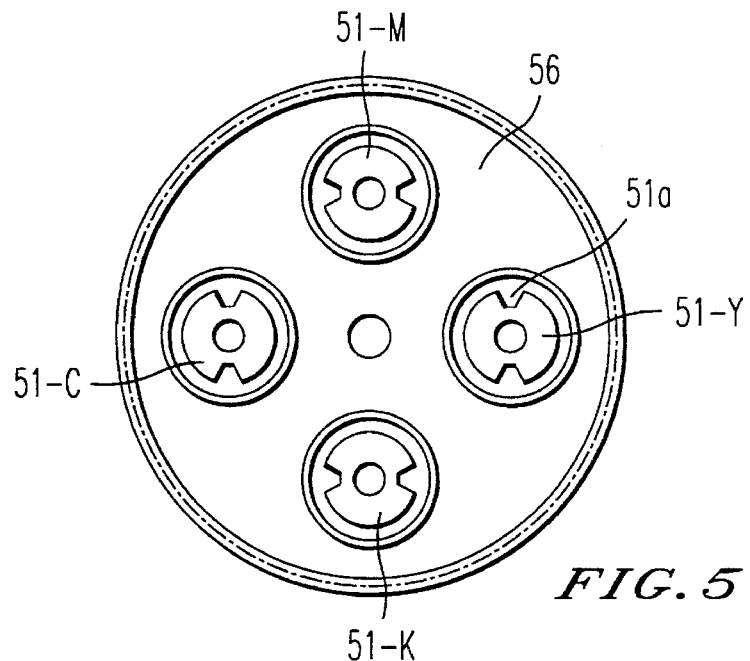
FIG. 5 is a rear elevational view of the developing device of the present invention.

In FIG. 5, the rear side view of the developing device 4 is illustrated.

Figure 6A:
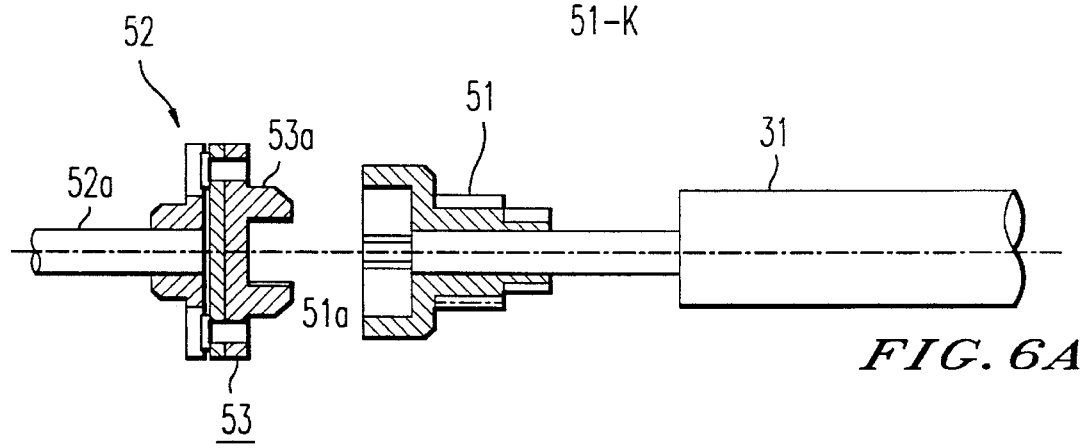
FIGS. 6(a), 6(b) and 6(c) are cross sectional views of the driving device and developing device showing abnormal positional relations.
Figure 6B:
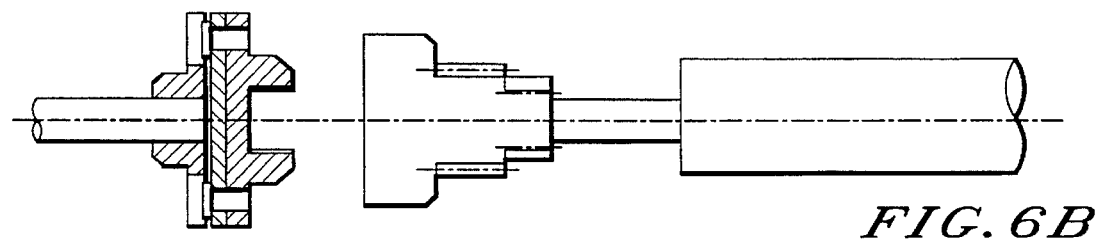
Figure 6C:
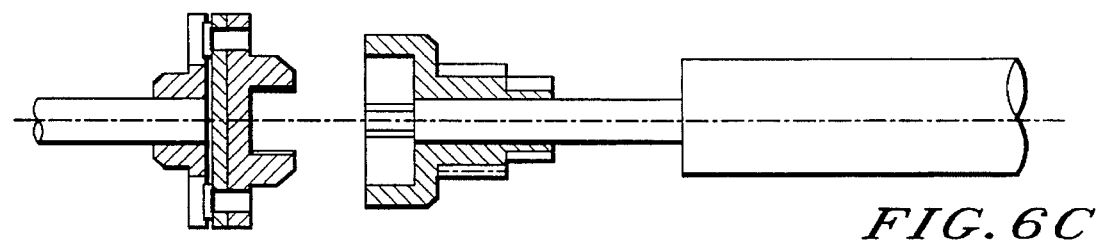

A cover 56 is set to the developing device 4, and the coupling gears (51-M, 51-C, 51-K, 51-Y) protruding from the cover 56 are disposed. As shown in FIGS. 6(a), 6(b) and 6(c), in actual usage there exist three kinds of incoincidence between the axis of the joint 52 and the axis of the toner supplying roller 31. FIG. 6(a) shows the case where the incoincidence is between the rotational centers of the joint axis 52a and the toner supplying roller axis. FIG. 6(b) shows the case where an incoincidence about the eccentricity of the axis, for example, in the toner supplying roller 31 exists. FIG. 6(c) shows another case where the incoincidence about an angle between those axes exist.

In such a condition, unevenness of the rotation of the developing roller 23 and vibration of the developing device 4 occurs when the above-noted engagement is made. However, the OLDHAM state coupling 53 as shown in FIGS. 4(a) and 4(b) corrects the unevenness of the rotation of the developing roller 23 and absorbs the vibration of the developing device 4.

The detail of the structure of the coupling device 53 is further explained referring to FIGS. 7(a), 7(b) and 7(c). As shown in FIG. 7(a), the coupling device 53 is composed of a disk 72 having a boss portion 72a and connected to the joint axis 52a, an intermediate disk 71 made of, for example, polyester plastic and a disk 70 having projection 53a.

In the intermediate disk 71, four grooves 71a each having a predetermined width are formed in a predetermined interval of the angle. Two pairs of pins 73 and 74, each having edges thereof which are connected firmly to either the disk 70 by way of, or for example, the bore 70a or the disk 72 by way of, for example, the bore 72a, are set through the grooves 71a and are provided with a larger diameter part (73a) (74a) so that the coupling 53, in particular the disks 70 and 71, never drops from the joint 52 in case the driving force is not transmitted (see FIGS. 8(a) and 8(b)). Thereby, the coupling 53 like an OLDHAM joint is made up.

Hereinafter, the state of each disk during the rotation of the coupling device 53 engaged with coupling gear 51 is explained referring to FIGS. 8(a)–8(i).

FIGS. 8(a)–8(i) show the state of the coupling device 53 during the rotation thereof at every 45° angle thereof. If there is a difference between the rotational center P-1 of the joint axis 52a and that of the axis of the toner supplying roller P-0, which corresponds to the center of the axis of the coupling gear 53, as shown in FIG. 6(a), the rotational center P-1, which corresponds to the center P-1 of the driving side disk 70, moves around the rotational center P-0, which corresponds to the disk 70, during the rotation thereof. Because the pin 73 (or 74) connected to the disk 72 (see FIG. 7(c)) moves relatively along the groove 71a by a length corresponding to the differences between the center of the joint axis 52a and that of the toner supplying roller 31, the intermediate disk 71 and the disk 70 move correspondingly.

Therefore, the driving force can be transmitted smoothly even in the case where a difference between the centers in the toner supplying roller 31 and the coupling gear 51 exists.

In the case there exists an eccentricity about the center of the axis of, for example, the toner supplying roller 31 as shown in FIG. 6(b), the rotational center of the joint axis 52a, which corresponds to the center P-1 of the disk 70, the driving force can be transmitted smoothly because the intermediate disk 71 moves to spoil the eccentricity about the center of the axis by the action of moving itself in a manner as mentioned above.

Also, if there exists an angle made by both the joint axis 52a and that of the toner supplying roller 31, which corresponds to the axis of the coupling gear 53, as shown in FIG. 6(c), the driving force can also be transmitted smoothly, because the intermediate disk 71 moves to correct the angle by the action of the moving itself as mentioned above.

Heretobelow, the successive developing process is explained. After the developing of the latent image formed on the photoconductive drum by one of the developing units 22 of the above developing device 4, the joint 52 moves toward the direction as shown by the arrow E in FIG. 4(b) and the connection between the coupling 52 and the coupling gear 51 and claw 51a is released.

Thereafter, the developing device 4 starts to rotate so that the next developing unit faces the latent image for different color developing newly formed on the photoconductive drum through the opening 22a thereof. The joint 52 moves again toward the developing device 4 so that the coupling 53 engages with the coupling gear 51. Thereby, the driving force is transmitted for the next monocolor developing process in the same manner as mentioned above. After that, the next developing process with a different monocolor toner is followed up in the manner as mentioned above.

In this way, all of the developing processes with different monocolor toners is completed respectively. Thereby all of the toner images are transferred to the intermediate belt respectively and the superimposed color and images are transferred to the copy sheet by one chance.

According to the above embodiment of the present invention, the smooth engagement between the driving force transmitting device and the receiving device is obtained. Also, the scale of the developing device of the image forming device can be minimized, and the unevenness of the rotating speed of the developing device or that of the toner image is avoided.

Figure 9A:
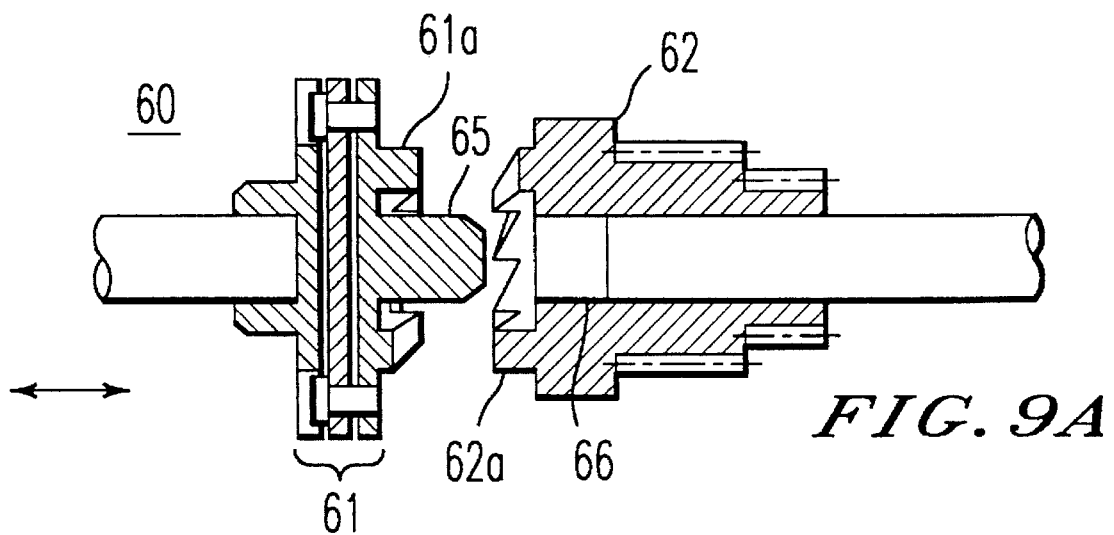
FIG. 9(a) and 9(b) are cross sectional views of another embodiment of the engaging device of the present invention showing the engagement.
Figure 9B:
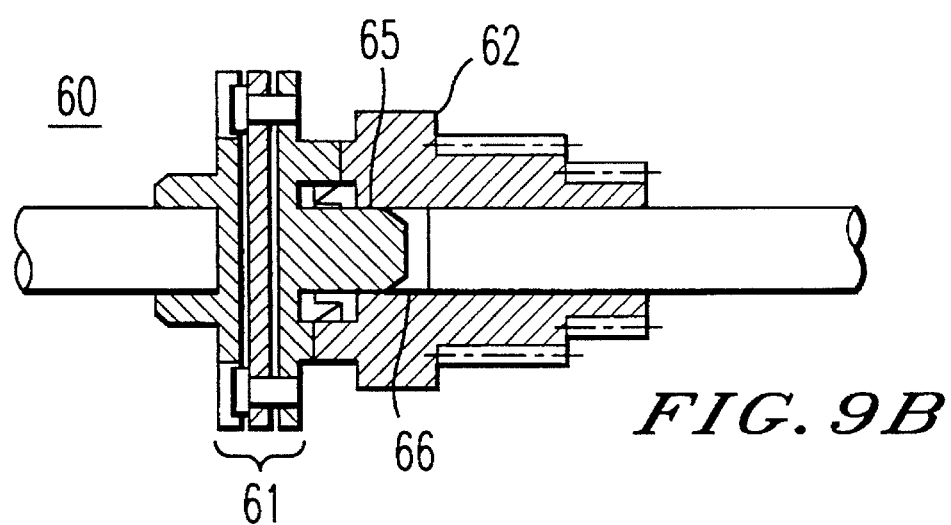

Heretobelow, another embodiment of the present invention is explained referring to FIGS. 9(a) and 9(b) which illustrates a joint 60. As shown in FIGS. 9(a) and 9(b), a gear 61a having teeth is formed at the edge of the coupling 61 around the axis thereof. Also, a gear 62a having teeth is formed at the coupling gear 62 around the axis thereof. Thereby, the gears 61a and 62a are engaged at the time the joint 60 is moved toward a predetermined direction by a certain length as shown in FIG. 9(b). As a result, the toner supplying roller 31 is rotated with a predetermined speed and direction by the rotational force influenced through the engagement made by the gears (61a, 62a).

In the center of the coupling 61, a protruding axis 65 having a tapered portion around the edge thereof is disposed. During the movement toward the above-mentioned direction, the axis 65 is led into the hole 66 formed at the coupling gear 62. Thereby, a smooth connection between the gears 61a and 62a is obtained, because of the tapered portion of the axis 65.

Figure 10A:
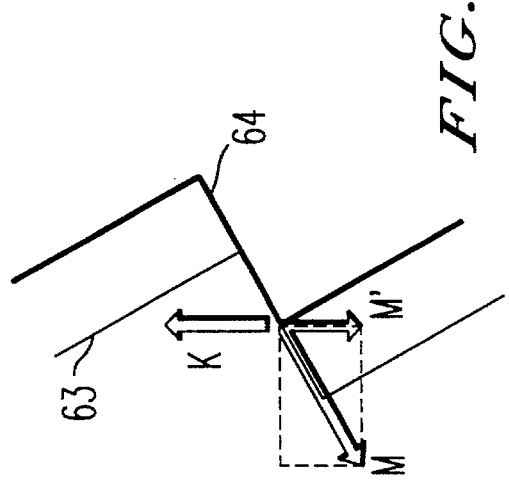
FIGS. 10(a) and 10(b) are partially sectional views of the gear showing the engagement of the other embodiment of the present invention.
Figure 10B:
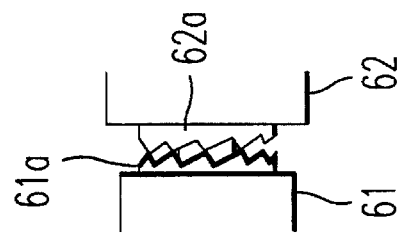
Figure 10A:
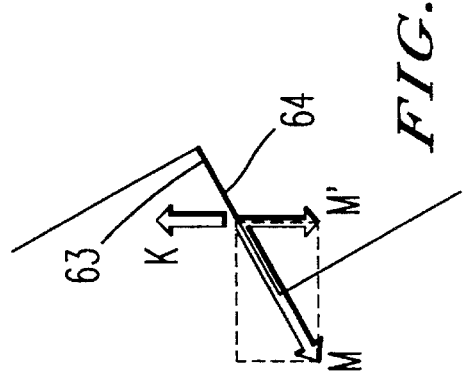
Figure 10B:
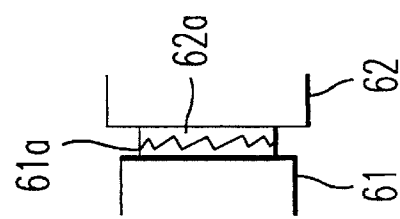

Hereinbelow, the detail of the engagement of the gears 61a and 62a is explained referring to FIGS. 10(a), 10(b), 10(a') and 10(b'). FIG. 10(a) shows the state where the gears 61a and 62a are engaging with each other. FIG. 10(b) shows the state where the gears 61a and 62a are not engaging with each other. FIG. 10(a') shows an enlarged detail of the engaging part of FIG. 10(a). FIG. 10(b') shows an enlarged detail of the engaging part of FIG. 10(b)

In case the driving force is transferred from the printer body to the engaging part where the gears 61a and 62a are engaged with each other, frictional resistance M occurs along the teeth 63 and 64 of the gears 62a and 61a. In such a condition, if the component force M' of the force M, which occurs in the direction in parallel to the rotational direction of the gears 61 and 62, is larger than the rotational load K made by both the developing roller 23 and the toner supplying roller 31, the rotating force of the coupling gear 61 is transferred to the coupling gear 62. To the contrary, if the component force M of the force M' is smaller than the rotational load K, the driving force of the coupling gear 61 is not transferred to the coupling gear 62 because of slipping which occurs between them.

Namely, in case more than a predetermined resisting load exists, the coupling 61 and the coupling gear 62 act as a torque limitter. The angle of the inclination of the surface of the gear tooth can be selected considering the frictional coefficient of the material thereof. Thereby, the rotational force of the coupling 61 can be transferred to both the developing roller 23 and the toner supplying roller 31 only if the resisting load made thereby is less than a predetermined level. Therefore, even if the frictional force is increased by, for example, a developing toner leaked from the toner container or an alien substance or the like entering into the bearing of the developing roller 23 or the toner supplying roller 31, the emitting of the heat of the driving motor, not shown in the figures is avoided by the help of the coupling 61 and coupling gear 62 as a torque limitter.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A revolving type developing device having at least three mono-color developing units, each unit having at least a developing roller and a toner supplying roller therein and disposed around an axis of said developing device, the revolving type developing device comprising:

a driving force transmitting means for transmitting a driving force to said developing roller, said driving force transmitting means being disposed in a body and movable toward said developing device in parallel to an axis of said developing roller; and a driving force receiving means for receiving the driving force from the body and transmitting the driving force to the developing roller, which is disposed in the developing device;

said driving force transmitting means comprising and OLDHAM joint and a first projection or recess means for engaging with the driving force receiving means, which is provided to said driving force transmitting means at a leading edge thereof; and said driving force receiving means comprising a second projection or recess means for engaging with the first projection or recess means of the driving force transmitting means, which is provided to said driving force receiving means at a leading edge thereof, said second projection or recess means of the driving force receiving means being coaxial with an axis of the toner supplying roller;

wherein the driving force is transmitted from said body to said developing roller at a time in which said driving force transmitting means is moved in parallel to said axis of the developing roller and said first and second projection or recess means are engaged with each other.

2. A revolving type developing device as claimed in claim 1, wherein:

said first projection or recess means provided to said driving force transmitting means is a coupling member capable of absorbing a difference about axes of both said driving force transmitting means and said driving force receiving means during a rotation thereof.

3. A revolving type developing device as claimed in claim 1, further comprising:

a set of guiding means each disposed in said driving force transmitting means and said driving force receiving means.

4. A revolving type developing device as claimed in claim 1, further comprising:

a prohibiting means for prohibiting said driving force transmitting means from rotating said driving force receiving means in a predetermined direction, said prohibiting means being disposed in said driving force transmitting means and said driving force receiving means.

5. A revolving type developing device as claimed in claim 1, further comprising:

a set of driving force limiting means for limiting the transmitting of said driving force from said body to said developing device in case that more than a predetermined rotational load occurs in said developing device, said driving force limiting means being disposed at said driving force transmitting means and said driving force receiving means.

6. A revolving type developing device as claimed in claim 1, wherein:

said driving force transmitting means rotates during the movement toward said developing device.

7. A revolving type developing device according to claim 1, wherein said driving force receiving means comprises a plurality of coupling gears which are provided on a side wall of the developing device, each of said coupling gears being positioned at predetermined intervals about a same circumference around an axis of the developing device.

8. A revolving type developing device according to claim 7, wherein each of said coupling gears corresponds to one of said developing units.

9. A revolving type developing device according to claim 7, wherein said driving force transmitting means comprises a coupling member which can be selectively engaged or disengaged with each of said coupling gears, wherein during a rotation of the developing device, the coupling member is disengaged from the coupling gears, and during a rotation of the developing roller, the coupling member is engaged with one of said coupling gears.

10. A revolving type developing device according to claim 9, wherein the coupling member and an axis of the driving force transmitting means are positioned adjacent to a developing zone.

11. A revolving type developing device according to claim 7, wherein said driving force transmitting means comprises a coupling member and moving means for moving the coupling member between a first position in which the coupling member is spaced from the coupling gears, and a second position in which the coupling member is engaged with one of said coupling gears.

12. A revolving type developing device having at least three mono-color developing units, each unit having at least a developing roller and a toner supplying roller therein and disposed around an axis of said developing device, the revolving type developing device comprising:

a driving force transmitting means for transmitting a driving force to said developing roller, said driving force transmitting means being disposed in a body and movable toward said developing device in parallel to an axis of said developing roller; and a driving force receiving means for receiving the driving force from the body and transmitting the driving force to the developing roller, which is disposed in the developing device;

said driving force transmitting means comprising a first projection or recess means for engaging with the driving force receiving means, which is provided to said driving force transmitting means at a leading edge thereof; and said driving force receiving means comprising a second projection or recess means for engaging with the first projection or recess means of the driving force transmitting means, which is provided to said driving force receiving means at a leading edge thereof;

wherein:
the driving force is transmitted from said body to said developing roller at a time in which said driving force transmitting means is moved in parallel to said axis of the developing roller and said first and second projection or recess means are engaged with each other;

said first projection or recess means of said driving force transmitting means comprises a coupling member having a tapered projection means;

said second projection or recess means of said driving force receiving means comprises a coupling gear which is fixed to the toner supplying roller; and said coupling gear comprises a concaved portion and a claw, said tapered projection means of said coupling member being adapted to be engaged with said concaved portion and said claw of said coupling gear.

13. A revolving type developing device having at least three mono-color developing units, each unit having at least a developing roller and a toner supplying roller therein and disposed around an axis of said developing device, the revolving type developing device comprising:

a driving force transmitting means for transmitting a driving force to said developing roller, said driving force transmitting means being disposed in a body and movable toward said developing device in parallel to an axis of said developing roller; and a driving force receiving means for receiving the driving force from the body and transmitting the driving force to the developing roller, which is disposed in the developing device;

said driving force transmitting means comprising a first projection or recess means for engaging with the driving force receiving means, which is provided to said driving force transmitting means at a leading edge thereof; and said driving force receiving means comprising a second projection or recess means for engaging with the first projection or recess means of the driving force transmitting means, which is provided to said driving force receiving means at a leading edge thereof;

wherein:
the driving force is transmitted from said body to said developing roller at a time in which said driving force transmitting means is moved in parallel to said axis of the developing roller and said first and second projection or recess means are engaged with each other;

said first projection or recess means of said driving force transmitting means comprises a coupling member having a tapered projection means; and said second projection or recess means of said driving force receiving means comprises a coupling gear which is fixed to the toner supplying roller;

said revolving type developing device further comprising:

a first gear formed on an outer surface of a sleeve of the coupling gear, said first gear having a first set of teeth which mesh with a second gear that is coaxial with and connected to the developing roller.

14. A revolving type device according to claim 13, wherein said first gear comprises a second set of teeth which mesh with a third gear that is connected to toner transferring devices.

* * * * *